Nov. 21, 1944. F. KAUTZ Re. 22,562
COMBINED FRAMING STRUCTURE AND BRACKET SUPPORT
Original Filed May 17, 1941 6 Sheets-Sheet 1
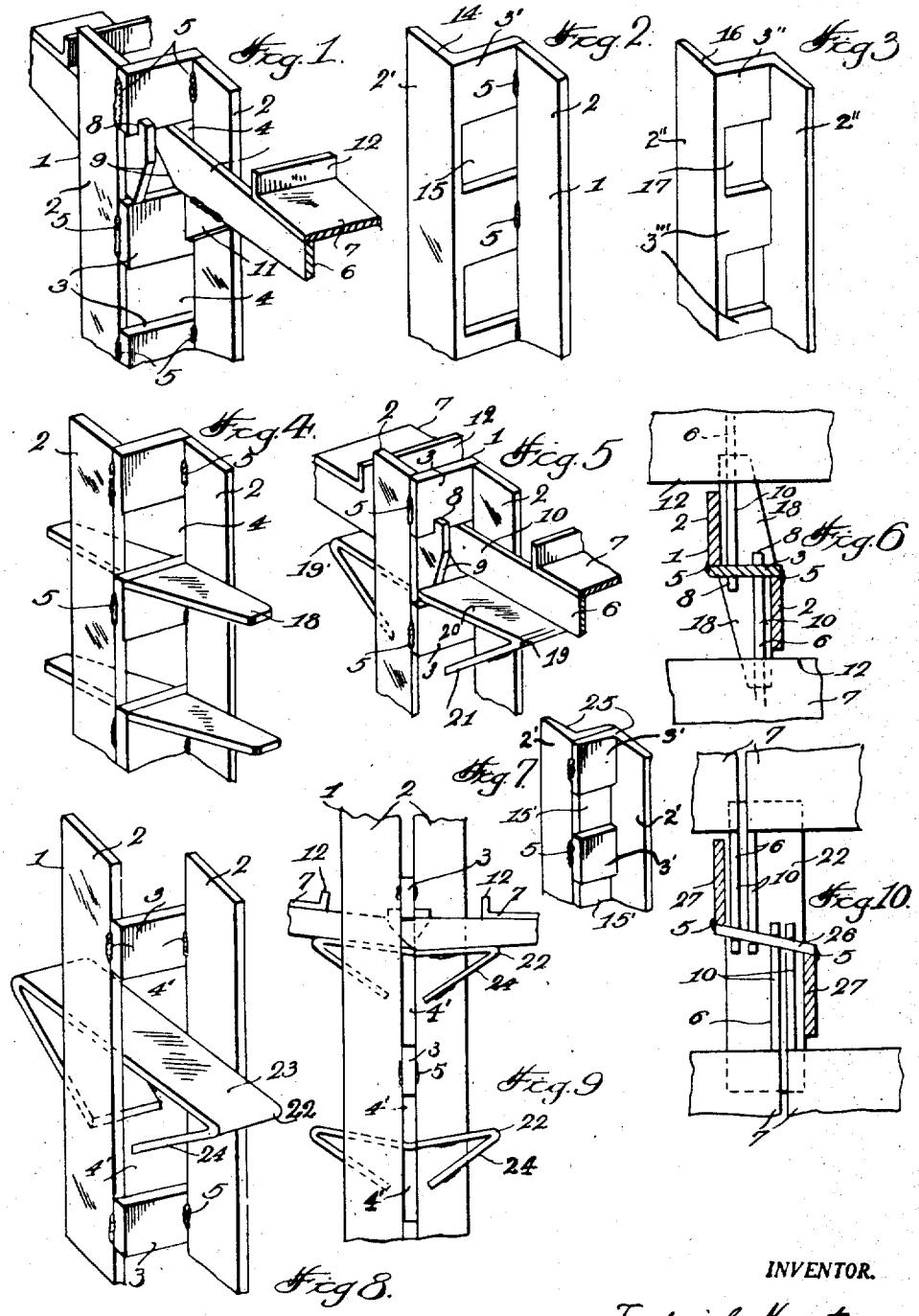
INVENTOR.
Frederick Kautz COMBINED FRAMING STRUCTURE AND BRACKET SUPPORT
Original Filed May 17, 1941 6 Sheets-Sheet 2
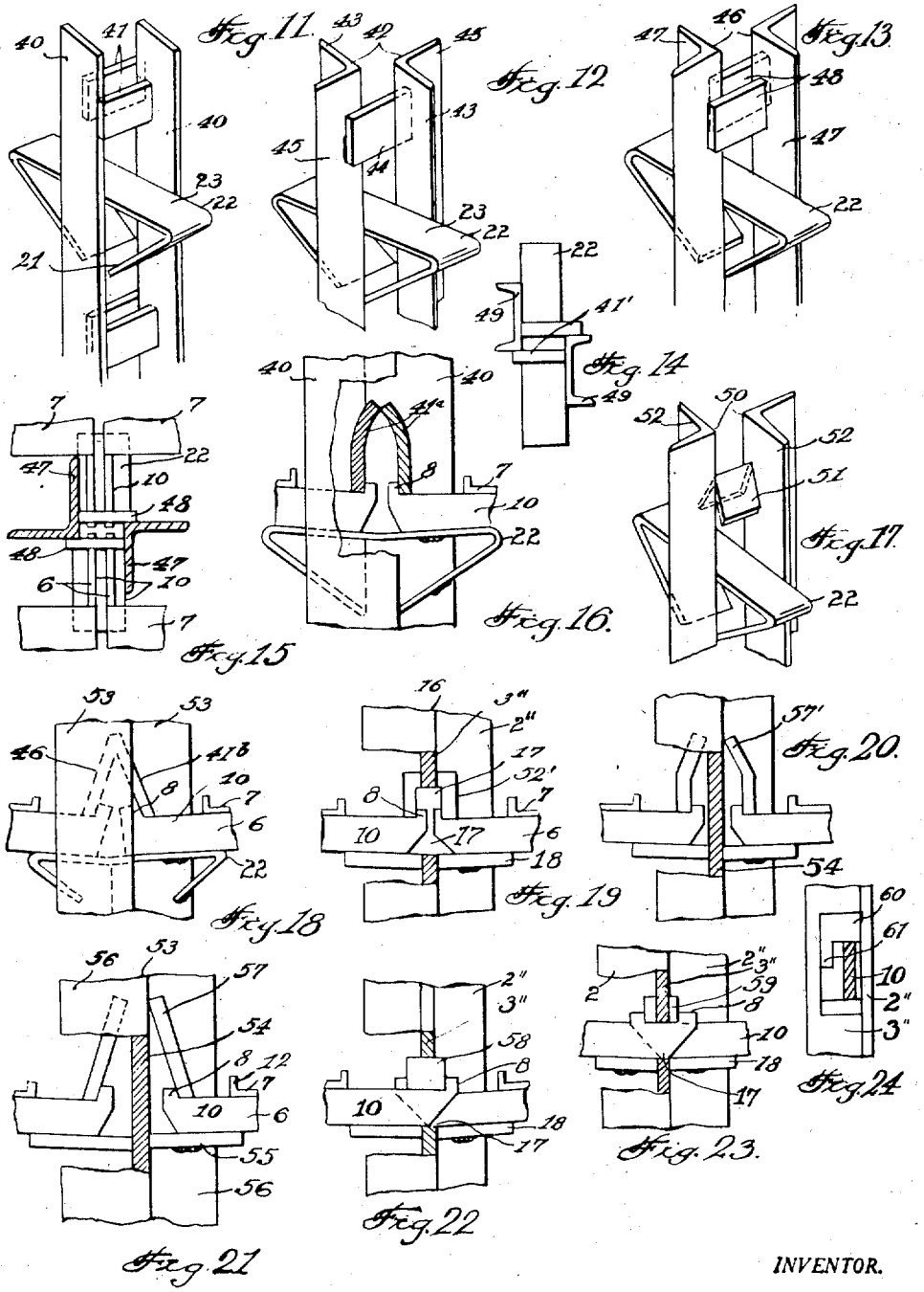
INVENTOR.
Frederick Kautz Nov. 21, 1944. F. KAUTZ Re. 22,562

COMBINED FRAMING STRUCTURE AND BRACKET SUPPORT

Original Filed May 17, 1941 6 Sheets-Sheet 3

INVENTOR.

Frederick Kautz

COMBINED FRAMING STRUCTURE AND BRACKET SUPPORT
Original Filed May 17, 1941 6 Sheets-Sheet 4
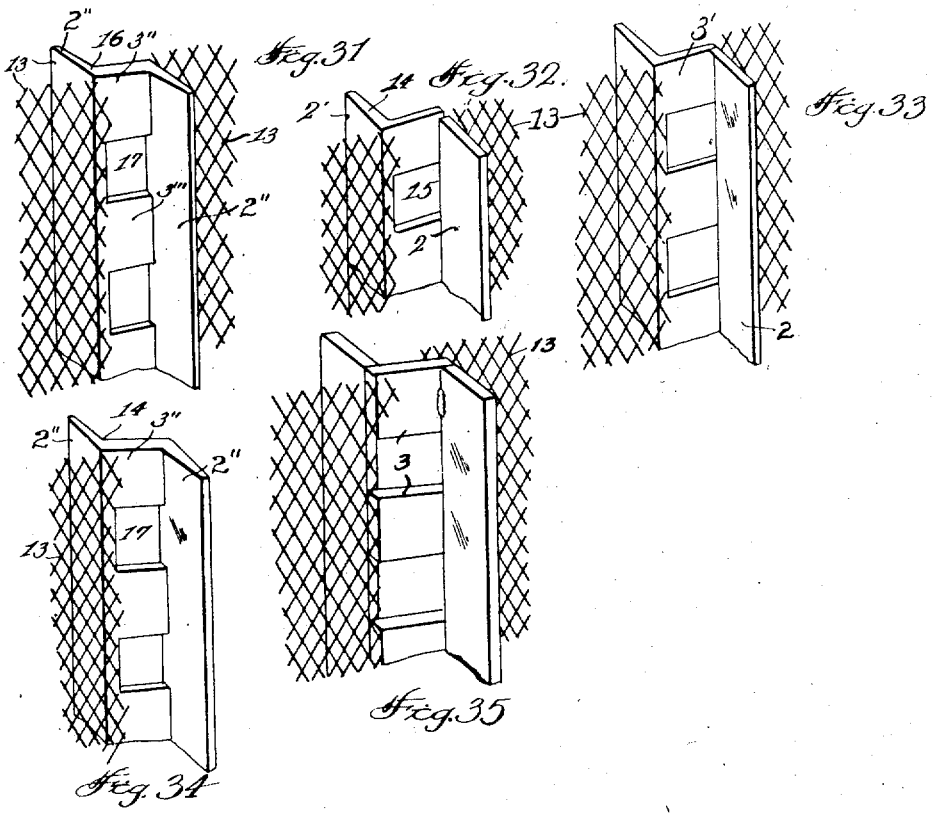
INVENTOR.
Frederick Kautz COMBINED FRAMING STRUCTURE AND BRACKET SUPPORT
Original Filed May 17, 1941 6 Sheets-Sheet 5
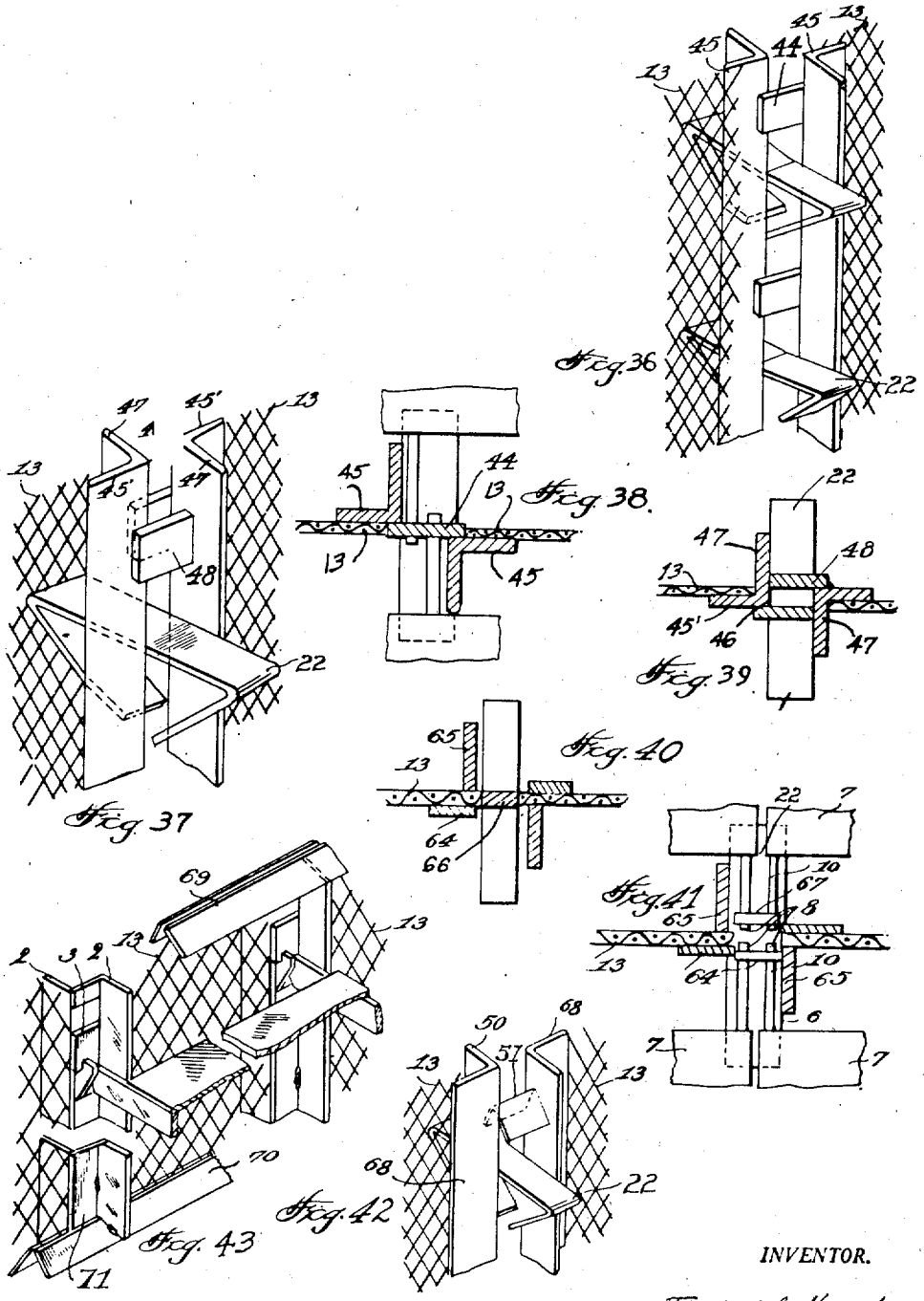
INVENTOR.
Frederick Kautz Nov. 21, 1944. F. KAUTZ Re. 22,562

COMBINED FRAMING STRUCTURE AND BRACKET SUPPORT

Original Filed May 17, 1941 6 Sheets-Sheet 6

INVENTOR.

Frederick Kautz

Reissued Nov. 21, 1944

Re. 22,562

UNITED STATES PATENT OFFICE 22,562

COMBINED FRAMING STRUCTURE AND BRACKET SUPPORT

Frederick Kautz, Philadelphia, Pa.

Original No. 2,326,783, dated August 17, 1943, Serial No. 394,021, May 17, 1941. Application for reissue May 17, 1944, Serial No. 536,001

30 Claims. (Cl. 248—235)

This invention relates to framing structures, especially those suitable to production in metal by rolling and similar operations, and particularly of that type illustrated in my copending application, Ser. No. 374,568, filed January 15, 1941.

It is an important aim of the invention to perfect such framing to use in providing a mounting for shelving and other structural and utilitarian features of buildings.

It is a particularly important aim of the present application and invention to, at the same time, coordinate the structural frame elements with shelf devices to the end that at the same time that the frame is erected, it provides means by which shelving may be put in place thereon, without addition of parts to the frame or attachment of supports to receive the shelving.

A further important aim of the invention is to present a construction in the essential frame parts, enabling them to be produced at low cost from stock rolled materials that are available commercially, as well as to enable their production as integral stock forms, if desired.

It is contemplated that the invention may be utilized for supporting other elements other than shelves by extension or adaptation of the invention herein disclosed.

It is an important aim of the invention to evolve structural frame elements which will enable the placing of shelving or the like and other articles in releasable and adjustable relation to the structural elements. It is also an important aim of the invention to coordinate the structural post or stud member in its form to shelf or other elements mounted on the post or stud member to the end that a highly rigid structure will be provided in which load stresses will be most effectively opposed with the use of a minimum of material.

Another aim of the invention is to evolve such post and stud structural members in metal with parts so arranged as to facilitate welding with speed and economy. A further aim is to provide a construction of post and stud elements and shelf or other mounting device in which there will be a secure coengagement of the parts under loads to prevent accidental disengagement, while yet leaving them rapidly detachable when desired. It is also an aim to attain the foregoing objects while at the same time enabling sectional shelves to be mounted so that the individual sections may be independently adjusted as to height.

Additional objects, advantages and features of invention reside in the construction, arrangement and combination of parts involved in the embodiment of the invention, as hereinafter disclosed, being particularly described and illustrated in the drawings, wherein Figure 1 is a perspective view of a post or a stud element having shelf devices engaged therewith at opposite sides, independently adjustable and removable.

Figure 2 is a similar view of a post section comprising a made-up member utilizing stock angle bar and flat strip bar.

Figure 3 is a view of a similar post element produced integrally as a stock material.

Figure 4 illustrates a modification of the post element of Figure 1 in which shelf seats are incorporated thereon.

Figure 5 is a view similar to Figure 1, showing a further modification of the shelf seat.

Figure 6 is a horizontal section showing the device of Figure 5.

Figure 7 is a similar perspective view of a portion of a post of a further modified construction, utilizing two simple stock angles.

Figure 8 is a further perspective view of a portion of a post, illustrating a further modification, particularly in the form of a shelf seat.

Figure 9 is a side elevation of the structure of Figure 8.

Figure 10 is a horizontal sectional view of a post element embodying the constructions of Figures 8 and 9, with shelving applied and illustrating a modification in the angular relation of the central web elements and the flanges of the post element.

Figure 11 is a similar view showing a modification in the relation of the webs and the flanges, whereby the flanges are disposed in lapped relation, Figure 12 is a similar view showing a modification of the cross sectional form of the post in utilizing two simple stock angle pieces.

Figure 13 is a similar view showing a modification corresponding to Figure 11, in which stock angles are utilized, and Figure 14 is a horizontal section showing the utilization of stock channel pieces in a corresponding relation.

Figure 15 is a horizontal section of the structure of Figure 13 with shelving in place.

Figure 16 is a fragmentary elevation, partly in section, showing a modification of the web connectors.

Figure 17 illustrates a modification of the connectors in a post such as illustrated in Figure 13.

Figures 18, 19, 20, 21, 22, and 23 are elevational views partly in section, showing further modifications of connecting webs and anchor elements for shelf members.

Figure 24 is a fragmentary elevational view of a post element showing an anchor portion modified to hold shelf-engaging arms against lateral movement.

Figure 25:
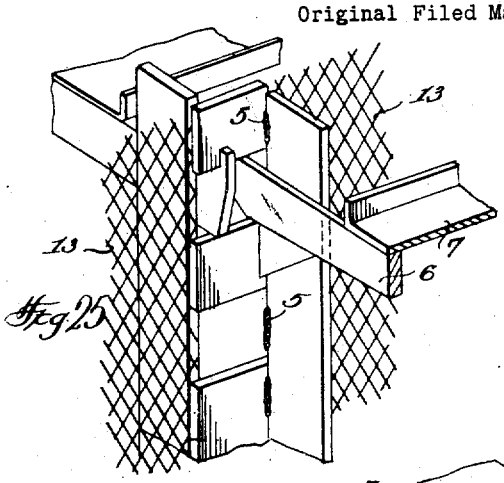
Figure 26:
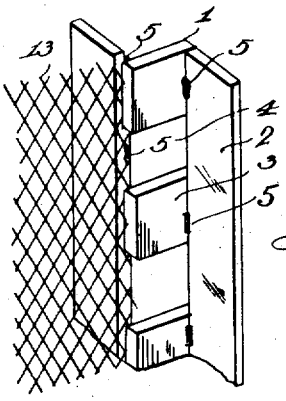

Figures 25 and 26 are fragmentary perspective views of a central partition and stud element with shelving engaged, and an end partition element, both corresponding to the structure of Figure 1.

Figure 27:
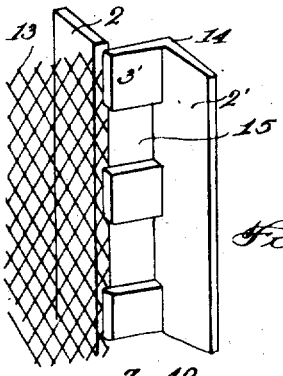

Figure 27 is a view similar to Figure 26 showing the utilization of the post element of Figure 2.

Figure 28:
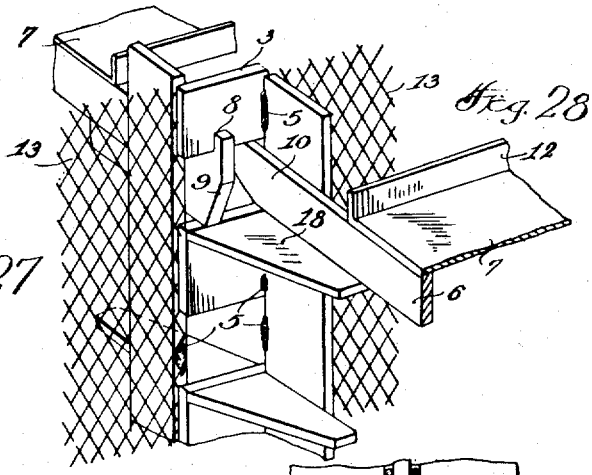

Figure 28 is a similar view of a central partition structure and stud with shelves engaged, embodying the post of Figure 4.

Figure 29:
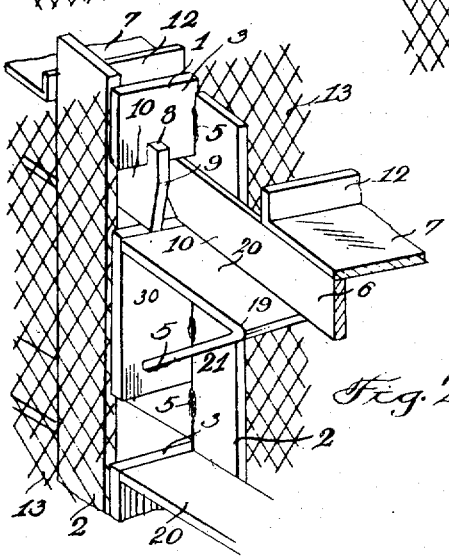

Figure 29 is a similar view embodying the structure of Figure 5 in a partition.

Figure 30:
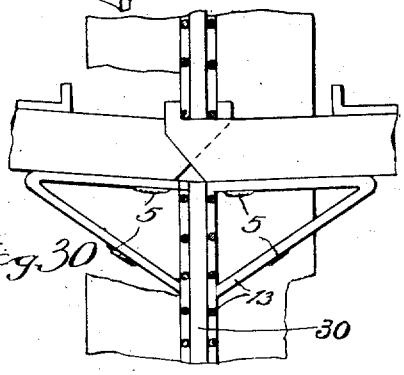

Figure 30 is a vertical cross section of the partition of Figure 29, showing the stud element with a portion of one side broken away.

Figure 31 is a perspective view of a portion of a post, as in Figure 3, incorporated centrally in a partition.

Figure 32 shows the device of Figure 2 similarly.

Figure 33 is a cross section showing a modification of the relation of the flanges and web elements of Figure 32.

Figure 34 shows the post of Figure 3 used at the end of a partition.

Figure 35 shows the post of Figure 1 incorporated centrally in a modified partition.

Figure 36 is a fragmentary perspective view illustrating the use of the structure of Figure 12 at a midway point on a screen or partition structure.

Figure 37 correspondingly illustrates the utilization of the structure of Figure 13 in a similar location.

Figure 38 is a horizontal cross section of Figure 36.

Figure 39 is a horizontal cross section of the structure of Figure 37.

Figure 40 is a horizontal fragmentary sectional view of a partition embodying a development of the elements of Figure 38, using strap strip stock welded together and upon the attached partition or screen material.

Figure 41 is a similar development of the elements of Figure 39, using simple flat stock strip.

Figure 42 is a fragmentary perspective view showing the utilization of the structure of Figure 17 midway of a partition, screen, or the like.

Figure 43 is a fragmentary perspective view of a screen or partition reinforcement structure with shelving mounted thereon, embodying my invention in structural wall elements and shelf mounting in a screen or partition reinforcement having top and bottom elements disclosed in my prior application.

Figure 44:
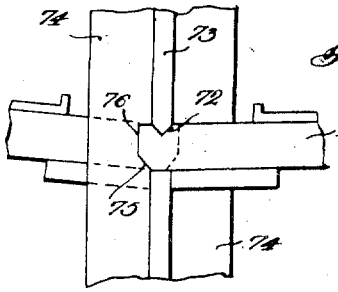

Figure 44 is a fragmentary side elevation of a stud element embodying my invention and having an improved locking means whereby a shelf device is retained securely in position.

Figure 45:
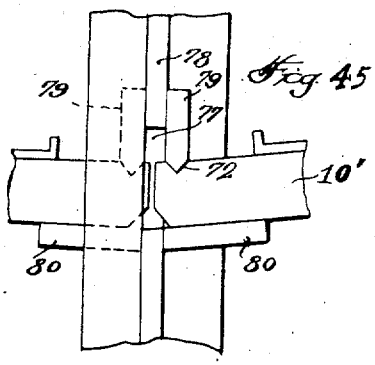

Figure 45 is a further modification utilizing a similar principle of locking the shelf devices.

Figure 46:
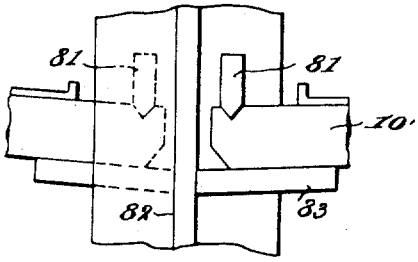

Figure 46 is a further development of a similar locking device, showing a continuous web in the stud element, requiring no apertures for insertion of the shelf arms.

Figure 47:
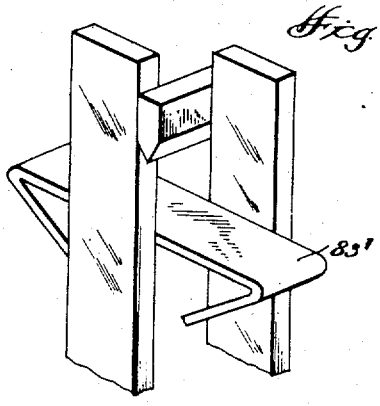

Figure 47 shows the development in which a similar locking arrangement is attained in a construction corresponding to that shown in Figure 8.

Figure 48:
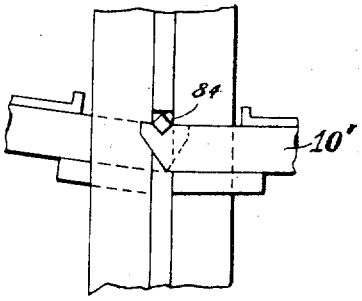

Figure 48 is a view similar to Figure 44 showing an inserted angle bar for engagement with a notched shelf arm.

There is illustrated in all of the figures an upright, post, stud, or load-carrying member, indicated throughout the views by the reference character 1, regardless of its construction, and being generally substantially in the shape of the capital letter Z in cross section. This member may be built up in several ways, as indicated hereinafter and shown in several of the views, or may be made in one piece, in a single rolling operation, in the form shown in Figure 3 and Figure 34. In all instances, the stud member includes continuous load-carrying and stiffening flanges extended in opposite directions from a connecting web portion, and in Figure 1, particularly, the flanges 2 consist each of stock strip metal arranged in parallel planes and extending in opposite directions from a given transverse plane, their proximal edges being connected by transverse web elements 3, a multiplicity of which are used, spaced longitudinally of the unit to afford openings through the web structure, the openings indicated by the ordinal 4. The web elements 3 are welded to the edges of the flanges 2, at the most convenient places, as indicated at 5. The openings 4, in the present instance, have a predetermined dimension related to the size of bracket arms 6, which are secured or formed as a part of shelf elements 7, carried upon the arms. The members 6 are also formed of flat metal stock of suitable weight for the purpose, their body portions attached to the shelf being arranged in vertical planes normal to the plane of the shelf in each instance, and in the present instance, shown as separate pieces welded or otherwise attached to the under sides of the shelves. The arms 6 extend rearwardly of the shelves, there being one arm located at each end of the shelf, in the present instance, and as many more intermediately of the length of the shelf as may be required for proper support of the shelf, and to aline with a number of stud or frame elements 1 in the structure upon which the shelving is to be mounted. In the present instance, the shelves are indicated as mounted on both sides of the member 1, their arms 6 being projected a distance from the shelves sufficient to enter through the openings 4 while the arms lie in vertical plane close beside or parallel to the flanges 2. At their extremities, the arms 6 are provided with knobs or nibs 8, extended upwardly, and arranged to engage against the side of the web element 3 thereabove when the arm is inserted through an opening 4, so as to prevent withdrawal of the arms 6 when in horizontal position or other normal supporting position for the shelf 7, or other article which may be carried upon the arms 6. Also, the ends of the arms from a distance below the top of the nibs 8 are bevelled or inclined longitudinally inward toward the lower part, as indicated at 9. This will facilitate introduction of the projecting rear ends 10 of the arms 6, so as to properly engage beyond the web portions, as shown in Figure 1, without requiring any great inclination of the shelf 7 in order for the nibs 8 to pass under the upper web parts. In addition, the projecting portions 10 may have formed or secured on their lower edges shoulder pieces 11, arranged to engage against the lower web piece 3 adjacent the opening through which the arm 10 is inserted, and to press against the face of this web piece, so as to properly sustain the whole arms 6 and 10 in proper supporting position in relation to the shelf 7. The shoulder element 11 may be omitted or otherwise formed, if desired, especially if the portion 10 of the arms fit snugly between the upper and lower web pieces 3 thereadjacent, or in case other rest or seat elements are provided to engage the arms 10 or 6 a distance outwardly from the member 1 assisted by the flanged rear edge portion 12 of shelf 7 which checks rearward motion of the shelf.

As illustrated in Figure 1, it is shown how my stud or upright may be utilized as a support for shelving, and at the same time it may comprise a column supporting other structural features resting upon its upper end, while its lower end may be set upon a floor or other suitable support.

The support shown may, at the same time, be utilized as a part of a panelling or combined stud and screen or reinforcement support, as shown in Figure 25, where there is conventionally shown a wire mesh fabric 13, secured to the stud at each side and extended in a common plane therefrom, at right angles to the arms 6, or parallel to the shelving 7. In the attachment of the screen material 13, it is preferably applied as the stud element is assembled, one edge of the screen material being located upon an edge of the strip which is to form the flange 2 at one side, while one of the web pieces 3 is adjusted in position to be welded to the flange strip with the screen material between the flange and the web. The web elements 3 may be taken successively when applied to the first flange, or any usual means for holding a plurality of the web elements in position over the flange and interposed screen may be employed, as preferred. After securing of the screen material at one side of the stud unit, the material at the opposite side may be likewise secured, completing the stud element proper with the screen material applied. If desired, the stud and screen material may be assembled in a panel form; with the screen material attached only at one side, while at the opposite side the flange 2 may be attached directly to the web element without interposition of the screen material, and after setting of the stud in place, in the building structure, the screen material to be attached may be laid against the outer face of the web elements, in the same plane with the material attached previously, but at the opposite side of the stud, and the screen material then welded to the face of the web elements. Or, the flange 2 at the side opposite that to which the screen is first attached may be left unattached, until the stud is set in place, at which time the screen material at that side of the stud may be set in place to come between the web element and the new flange to be attached, after which the flange is set against the screen material in proper position with respect to the web element, and by simple electrical or other welding operation, at the junction of the new flange, screen material and web elements, the three parts are secured together in one operation. In the assembly of the stud element and screen material in the factory, three parts are likewise secured together by one welding operation, it being sufficient to apply welding material so as to join the web element and edge of the flange thereadjacent, the fluxed material at the same time fastening the wire mesh. By applying the weld at the inner side of the flange, a distance from the body of the screen material, the extreme edge portion only of the screen material is fluxed in the welding operation, and the heat of welding is transmitted so rapidly to the flange and web material that the body of the screen immediately adjacent the stud is not excessively heated, and will suffer in a minimum degree from deterioration or weakening by heat applied. In Figure 26, screen material 13 is secured only between one of the attached flanges 2 and respective edges of web portions 3 of the stud of Figure 1. In this manner, an end support for a partition or screen may be constructed.

A stud member Figure 1 may be produced in corresponding form with different structural elements, as for instance in Figure 2, where the stud consists of a stock angle 14, one flange of which is crenelated so as to form slots 15 extending to the root of the crenelated flange and spaced web elements 3', and against the extremities of these crenelles thus formed, the second flange strip 2 is welded, as before indicated, supplemented by the integral flange 2' of the stock angle 14 at opposite side of stud. In the event that this form of stud is used in a partition, the screen material 13 has one edge portion welded against the outer face of the crenelated flange portion at the root of the flange, while the oppositely extended mesh material, if any, is secured between the second flange 2 and the outer parts of the crenelles, in accordance with the construction of the structure shown in Figure 32. In Figure 27, the manner of using the stud of Figure 2 as an end support for a partition reinforcement or screen, is shown, the screen material 13 being secured by welding only between the attached flange 2 and the extremities of the web elements 3'.

In Figure 3 there is illustrated a stud of the general form of that shown in Figure 1, but obviating the assembling operations, required for the first device, by utilizing a Z-shaped rolled stock member 16, having flanges 2'' extended from opposite sides with an integral web portion 3'', and the web portion punched out to form slots 17, the intervals between which provide web members 3''' of the same dimensions as those numbered 3 in Figure 1, and as previously described.

The device of Figure 3 may be utilized in the same manner as described in connection with the stud element of Figure 1, except that there being no attached flanges on this unit; the mesh material must be welded to the outer faces of the web members 3''' and adjacent the edges of the flange elements 2'', at the angles of the stud as shown in Figures 31 and 34 with the mesh material secured to opposite sides or one side of stud respectively.

In Figures 4 and 6, the stud member of the general construction involved throughout the application, is provided with seat plates or brackets 18, consisting of flat metal stock trimmed to provide a piece with two edges at right angles to each other, which are set in the angle at the junction of the flange and web elements 3 of the stud in Figure 1, the device being elongated so as to project beyond the flange to which it is attached, and extending in the same general direction. In the present instance, the plate is tapered toward its extremity, and if desired, may be inclined from that extremity downwardly toward its junction with the web element 3. The arm 6 of the shelf element may rest on the bracket plate 18, as seen in Figure 6, and be sustained more positively at its normal loaded position. By the welding of these bracket plates 18, the stud flanges are stiffened and the stud member greatly strengthened, as will be appreciated. These bracket plates are preferably alined with the lower edges of the openings 4 in the stud device, and serve as gusset plates, as before indicated, in addition to supporting the load on the shelf more effectively.

In Figure 5, there is shown a further development of the bracket device at 19, consisting in this case of a much longer plate than the one 18, bent on a transverse line midway of the plate to afford a top rest plate 20 on which the arms 6 may lie when engaged with the stud member, as before described, and a downwardly and inwardly extended arm 21, which serves as a buttress or stay for the outer end of the plate 20. The extremity of the plate 20 at its inner end is welded to the vertical face of the web elements 3, or may rest against or on the top edge of the element 3 and be welded thereto. In addition, it may be secured to the adjacent flange 2, if desired, although this is not necessary. The diagonal stay piece 21, however, is welded to the flange 2 under the plate 20. The device 19 is thus substantially V-shaped in longitudinal section, and a duplicate one 19' may be attached to the opposite side of the stud member, in the same manner as first described, and shown in Figure 5.

In Figures 8 and 9, it is shown how two bracket members corresponding to those 19 of Figure 5 may be formed in one piece, indicated by the character 22. In this case, a strip of flat strip stock, about twice the length of that required for one of the brackets 19, is utilized, and its two end portions bent downwardly and inwardly thereunder, to form in the middle part of the strip a rest plate 23 having diagonal stay ends 24 thereon. This device is introduced through the opening 4' and welded to the flanges 2 of the stud. If desired, the plate 23 may be bent upwardly from its middle in each direction, as shown in Figure 9. As further shown in these figures, the web pieces 3 may be of small vertical dimensions and the opening 4' correspondingly larger, the top edges of these web portions not being required for sustaining the load. In such arrangement, the bracket elements 22 will be supported entirely by the flanges 2 of the stud. In Figure 7, there is illustrated a manner of producing the Z-shaped stud or upright from two simple rolled stock angles, both of which are notched in the same manner as the angle 14 of Figure 2. The angles 25 are both thus formed with interrupted web portions 3' and alternated openings 15'. These crenelated flanges are brought together with their uninterrupted flanges 2' extending in opposite directions from opposite sides of the assembly, the base of one flange 2' being located at adjacent the extremities of the projecting web parts 3' of the opposite angle. The two pieces are then secured together by welds between the extremities of the web elements 3' and the bases of the flanges 2' at the outer sides of the latter, the welds being indicated generally by the character 5.

In Figure 10, there is illustrated in cross section a slight modification of the structure of the stud of Figure 1, utilizing similar parts. In this instance, the transverse web part 26 is formed of pieces similar to those used at 3 in Figure 1, and extend at an oblique angle between the two flanges 27, which correspond to the flanges 2 first described, and are in parallel planes. The device of Figure 10 may have brackets 22 mounted therein, in the manner shown in Figures 8 and 9. In this figure, a plurality of shelves 7 with their arms 6 are shown in place at opposite sides having the portions 10 under the web element 26 as shown. The oblique web 26 presents a graded line to the sides of the oppositely engaged portions 10 which are thus under the exertion of separating from each other, as will be readily understood.

Figures 28, 29 and 30 illustrate the utilization of the devices of Figures 4 and 5, in a partition or screen, with the screen material or reinforcement 13 extending from opposite sides of the stud 1, and except for the top web pieces 3 shown in Figures 29 and 30, the web pieces 30 therebelow are of greater vertical dimensions than in Figure 1, and the stay portion 21 of each bracket member 19 is rested against the lower part of the web 30. The manner of engagement of the shelving with these devices, and the manner in which the screen material is attached and secured, are in accordance with the prior description.

Figure 33 illustrates the stud or post element formed as in Figure 2, but with mesh material incorporated at opposite sides.

Figure 35 illustrates the stud member or upright constructed as in Figure 1, and webbing such as screen material or reinforcing mesh applied after complete assembly of the upright body, the screen material 13 being applied against the major transverse faces of the web members 3.

In Figure 11 there is shown a modification of the device in which flange strips 40 are arranged in parallel planes, but with their proximal edges arranged in parallel planes normal to a medial part of the opposite flanges, and secured together by means of transverse web elements 41, arranged in pairs in transverse alinement, each one being welded across the edge on one flange, at one end of the web element, while the opposite end of the web element is butted against the intermediate inner surface of the opposite flange 40 and welded thereto. Brackets 22, the same as previously described, may be adjusted between the flanges 40, the brackets being made of flat stiff material of a width to fit snugly between the flanges, to which the edges of the brackets are welded, as previously indicated. The web elements 41 of each pair are spaced above the flat piece of each of the brackets 22 a suitable distance for coengagement with inserted arm portions 10 of shelving, as previously described, so that the nibs 8 may engage outwardly of the far or near web element 41, as may be preferred.

In Figure 12, the upright unit is formed of two angles 42, arranged with two flanges 43 in parallel planes, spaced apart to receive one of the brackets 19—22 therebetween snugly, as shown, and spaced slightly longitudinally of the bracket so that the transverse web piece 44 may be laid in lapped relation against the flanges 45 which extend at right angles to the flanges 43. The web pieces 44 being welded to the angles in that relation so as to hold the angles securely in position, the web piece being spaced above the top plate 20 or 23 of the bracket 19—22 in a proper relation to receive the arm portion of a shelf element thereunder, as will be understood.

In Figure 13, the two angles 46, the same as the angles 42 shown in Figure 12, are arranged at the opposite sides of the bracket 22 snugly thereagainst and welded thereto, so that the inner flanges 47 which are against the bracket 22, have the same relation as the flanges 40 of Figure 11, pairs of transverse web elements 48 being coengaged between and against the flanges 47 in the same manner as the web members 41 are engaged against the flanges 40.

The latter construction is illustrated in plan, in Figure 15, where the end members of two sets of shelves are shown engaged upon the uprights, the bills 8 of the respective arm portions 10 being located between the web elements of each pair.

Figure 14 illustrates the use of two channel members 49, in the same relation as the flanges 40, transverse web pieces 41' arranged in pairs therebetween and secured as in Figure 11, the brackets 19 or 22 being mounted between the channel members under each pair of web pieces, as will be understood. The use of angle or channel members, as seen in Figures 12–15, adds more strength to the units, as will be also understood.

In Figure 16, the structure of Figure 11 may be represented, except that the transverse web elements 41*a*, corresponding to those 41 first described, have their upper edge portions bent toward each other, and the web elements in other corresponding constructions may be likewise bent, if desired, adding to the rigidity of the relation of the two flange pieces. This figure shows the manner in which the shelf arms coact with the elements of the uprights.

Figure 17 illustrates a further method of forming the transverse connection between two angle pieces 50 or other flange elements, the angle pieces being arranged in the same relation as described in Figure 13, while the transverse connection consists of a short length of angle piece 51 cut to fit snugly between the mutually adjacent flanges 52, so that the angle between the flanges of the piece 51 is at the upper side extending transversely between the flanges 52, and the lower edges of the flanges of piece 51 are arranged at a common level extending transversely between the flanges 52. A bracket 22 is shown engaged between the angles 50 spaced below the transverse piece 51, so that shelf arms may have their nibs 8 engaged under these edges respectively, while the arms rest upon the brackets.

In Figure 18, there are illustrated two simple flat strip stock flanges 53, arranged in the same relation as the flanges 40 of Figure 11, and between the lapped portions of the two, diagonal web elements 41*b* are secured, as connecting members between the flanges, their lower edges being spaced so that arm portions 10 of the shelves 7 inserted from respective sides may engage with respective lower edge portions of the members 41*b*, as illustrated, brackets 19—22 being incorporated under the members 41*b*, in accordance with previous descriptions.

In Figure 19, there is shown an upright substantially Z-shaped in cross section, formed in one piece, as at 16, in Figure 3, and over each opening 17 at opposite sides of the web, spaced apart transverse anchor bars 52' are secured against the flanges 2'' and the web portion 3'', the lower edges of the anchor bars stopping short of the level of the lower edge of the opening 17 a proper distance to receive the nibs 8 of arm portions 10 upon the shelf 7, the arm portions 10 resting upon bracket plates 18, corresponding to those shown at 18 in Figure 4.

In Figure 21, a construction is embodied in which a Z-shaped stock roll structural form 53 of continuous material without apertures through the central web 54 is utilized by securing bracket plates 55 to opposite sides of the web portion 54 and to the flanges 56, substantially in the same manner as the bracket plates 18 are mounted in Figures 4 and 19; and at a proper height above the bracket plate 55, planiform anchor plates 57 are welded to the respective flanges 56 and to the web portion 54 on each side of the upright, these plates 57 being inclined, so that their lower transverse edge portions are spaced above the bracket plates 55 at a sufficient distance from the web 54 to permit the nibs 8 of a shelf arm, such as before described, to be engaged thereunder, as shown in Figure 21.

In Figure 22, the one-piece Z-shaped stock is utilized, but perforated substantially as shown in Figure 3, a transverse anchor block 58 being set in the upper part of each opening 17, this anchor block being of a thickness substantially greater than that of the web 3'', so that it projects on each side thereof. Space between the block 58 and the lower side of the opening 17 is sufficient to permit insertion of an arm portion 10 primarily, so that the nib 8 may engage at the far side of the block 58, with the arm resting on the lower edge of the opening 17, additional support of the arms of shelving may be afforded by bracket members 18 located and secured as heretofore described.

Figure 20 illustrates a further development of the idea in Figure 21, wherein transverse anchor plates 57' are bent so that their spaced apart lower portions extend vertically while their upper parts are bent inwardly toward the web 54 of the angle stock, the device being otherwise the same as, and utilized in the same manner as the device of Figure 21.

Figure 23 illustrates a further method of broadening the bearing at the upper side of the opening 17 in Z-shaped stock of the form illustrated in Figure 3, small anchor bars 59 being welded to the web portion 3'' on each side, immediately above the opening and flush with the lower edge of the web portion 3''.

In Figure 24 the same structure of stock structural iron or steel is involved, and here, the upper edge of the opening, or lower edge of an anchor bar 60 secured to the web portion 3'' is formed with a downward extension 61, adapted to limit the position of the inserted arm portions 10 which may be engaged with the device, so that these arm portions are held close against the adjacent flange 2'', preventing longitudinal shelf movement. It will be understood that means corresponding to the device at 60—61 may be incorporated in the other forms of the device herein presented, as discretion may dictate.

Figure 36 illustrates the utilization of the stud device of Figure 12, in a central part of a screen structure or partition reinforcement, the screen material 13 having its edge portions secured against the outer faces of the lateral flanges 45. The material at opposite sides of the stud thus is in a common plane with the transverse web elements 44, as shown by horizontal cross section in Figure 38.

Figure 37 likewise, illustrates a utilization of the device of Figure 13 in a similar situation, that is, at an intermediate part of a screen or partition reinforcing structure, and in this instance, as shown in Figure 37, and by the horizontal cross section in Figure 39, the mesh material 13 is welded to the inner faces of the lateral flanges 45', whereas in the uprights of Figure 36, the material is engaged against the outer faces of the same flanges. The remaining details of the stud elements of Figures 36 and 37 are the same as those previously described in connection with Figures 12 and 13 respectively.

Figure 40 is a cross section showing a manner of building up an equivalent of the general form of stud shown in Figure 38, using plain flat stock bar material throughout. In this case, two angle elements are involved, each including a lateral or side flange 64, and a front flange 65, disposed at right angles to each other and secured to each other with an interposed edge portion of screen material 13. The edge of the screen material is flush with the inner faces of the flanges 65 and inner edge portions of the flanges 64, and longitudinally of the angularly arranged flanges, suitable web elements 66 are set between the two L-shaped members in a plane with the screen material, and suitably secured in position. In Figure 40 a bracket element 19—22 is indicated formally, the arrangement of which may correspond to that previously described in other forms of corresponding shapes.

In Figure 41 two angle elements comprising flanges 64 and 65 as before described, with a similar arrangement of the web mesh material 13 are involved, but in place of the single web element of Figure 40, two web elements 67 are provided, which are secured edgewise against the flanges 64, and positioned against the flanges 65 at a distance from the mesh material 13, so that a substantial space is formed between the two web units at each pair. These webs 67 are thus arranged in pairs, and bracket elements 19—22 may be mounted between the flanges 65 in such relation as to permit the arms of shelving previously described to be inserted under the web pieces and the arms lowered to rest upon the brackets, as before described, the ends of the arms engaging only under the near web elements 67, as shown, so that two sets of arms may be engaged with each web, without interfering with those at the opposite side.

In both the devices of Figures 40 and 41, in case the stud unit is to be used at the end of a partition or screen, the pieces 64 and 65 may be omitted at one side, and a common single piece angle stock substituted, of corresponding length, and similarly secured to the remainder of the unit illustrated.

In Figure 42 there is illustrated how the device of Figure 17 may be utilized centrally of a screen or partition reinforcement and the like, the screen material 13 being secured against the inner faces of the lateral flanges 68, these flanges being offset from one another slightly, so that the screen material at opposite sides lies in a common plane with the material at the other side.

Figure 43 illustrates the utilization of the stud element of Figure 1, centrally in a partition, or otherwise, where upper and lower edges of the screen material are secured in a horizontal member, which may be united with the stud elements. In this case, each stud element is shaped at the ends to receive the angularly disposed flat stock bars 69, as shown at the top, and 70, as shown at the bottom. In the first instance, the proximal edges of the bars 69 are the elevated edges, the bars being disposed at approximately an angle of 90 degrees, although this may be varied, and sloping down from the junctions on each side of the screen material 13, which is interposed between the proximal edges and welded at the outer side of the angle, the screen extending downward within the angle at the concave side. At the bottom of the structure of Figure 43, the reinforcement 70 comprises two similar bars which, however, instead of being sloped from their junctions with the screen material inwardly so that the body of the screen material engages within the angle, are arranged in a reversed relation, the bars sloping downwardly and away from the screen edge, which is engaged between the bars at the apex of the angle and extending from the convex side of the angle, or other side of the angle. The bars 70 may stop at the flanges 2, so as to butt thereagainst, or the flanges 2 may be cut at a suitable inclination to fit upon the respective bars, and the central web portion either cut away or omitted, to a suitable height, to permit the elevated parts of the bars 70 to be set in place extending continuously across the bottom of the stud. If desired, in order to strengthen the base of the stud, the lowermost web elements 71 may be of increased vertical dimension, extending from the raised junction of the bars 70 upward a distance greater than the vertical dimension of the web sections 3, first described.

In Figure 44 there is illustrated a modification of the extremities of the arms of the shelving, and the lower edge portion of the web elements which engage therewith, the parts of the arm portions 10' shown in this figure and corresponding to the nibs 8, first described, being simply V-shaped notches 72, cut in the upper edge of simple flat strip stock, so that the nothing requires to be elevated above the major portion of the arm, and it may be produced from simple base bar stock with less waste of material than would be involved in the production of the arms 6—10, with nibs 8 thereon. A web portion 73 is illustrated, which may be a member connecting front flanges 74, corresponding to the flanges 2, first described, and others in similar functional positions, and the flanges 74 and webs 73 may be part of an integral Z-shaped stock, or may be produced by the various assembly methods before described. At each opening through the web portion, however, the upper edge bounding such opening is bevelled on opposite sides, so as to produce a V-shaped edge adapted to fit into the notch 72 of the arm element 10'. The stud element may otherwise conform to any of the various constructions before described, the utilizing of bracket supports or other corresponding devices being within the discretion of the user. The ends of the arms 10' are preferably bevelled at their lower parts, as at 75, so as to facilitate engagement of the nose portions 76 at the ends of the arms 10' through the openings and under the web elements 73.

In Figure 45, a stud element is illustrated in which openings 77 are formed through the web portion 78 of the stud, which otherwise conforms to the general Z-shape, previously disclosed, and may be produced by any of the various assembly operations described, the openings 77 being of somewhat greater height than illustrated in Figure 44, but the arms 10' being approximately the same construction as in Figure 44. On each side of the web 78 in this view, at the upper side of the opening 77, anchor bars 79 are welded against the faces of the web, their lower edge portions extending below the lower edge of the web portion 78 at the opening, and each anchor bar having a V-shaped lower edge spaced from the lower side of the opening, or from any bracket device included in the upright, a distance such that when the arm portion 10' is engaged under the bar 79, the lower end of the bar engaged in the notch 72 of the arm the extremity of the arm will stop short of any similar arm which may be engaged with the bar 79 at the opposite side of the stud in a similar manner, and the lower edge of the arm 10' may rest upon the bracket device 80, which may correspond to any of these previously described.

In Figure 46 there is shown a further improvement utilizing the notched arm 10' (in which it is made unnecessary to form openings in the web portion of the stud, and instead, anchor bars 81 are provided, spaced some distance away from the central web portion 82 and welded to the flange at the respective side of the stud element, against which the bar 81 abuts. When the arms 10' are engaged under the anchor bars 81 having lower V-shaped terminals, and rested upon the bracket elements 83, which may correspond to any of those bracket devices previously described, the extremity of the arms 10' stop short of the web 82 and their notches interlock with the V-shaped terminals to prevent general withdrawal or loose movement of the shelf element carried by the arm.

Figure 47 illustrates the formation of V-shaped anchor edges on the lower parts of such web elements as those illustrated in Figures 1 and 8, the bar 83' serving to coengage with shelf arms projected thereunder from opposite sides of the stud in relative positions of stud and shelf illustrated in Figure 5.

Figure 48 illustrates a further modification of the anchor bar for use with the type of shelf arm last described, and constituting a simple piece of hard stock, square in cross section, with one of its angles projected downwardly, the bar being located in the upper portion of an opening 84, and welded in place in a suitable way, befitting the type of stud and structure otherwise provided. This device being adapted to use bracket elements, as previously described, where arm portions 10' from opposite sides are shown engaged thereupon.

It is an advantage of the type of arm shown at 10' in the last described figures that by the proper location of the diagonal anchor bars such as shown in Figure 21, and the cross piece 51 shown in Figure 17 in proper relation to the brackets 19 or other support means for the shelf arms, no specifically formed stock will be required, and the common angle stock or other bar stock simply cut in proper length for welding in place, may be utilized to coact with the arm elements 10' in a proper manner.

In all of the figures, the oppositely extended flanges, as, for instance, indicated by the reference character 2 in Figure 1, are of a width greater than the separating web or web elements, in accordance with the aim to oppose load stresses most effectively with the use of a minmium of material.

While I have disclosed the various specific embodiments of the invention herein, it will be understood that these are exemplary, and that combinations in one device of features of various of the figures and modifications before described, may be utilized to embody the invention, as contemplated, and variations in proportions and substitutions of materials and equivalents may be made without departing from the spirit of the invention, as more particularly set forth in the appended claims.

I claim:

1. A device of the character described, comprising in combination, a stud element or the like having a medial portion and oppositely extended flanges disposed in substantially parallel relation to each other, said medial portion having an aperture therethrough, and opposed members to be supported with said stud element therebetween, having an extension element insertable through said aperture from respective sides of the stud.

2. In a structure of the character described, a structural element for walls, partitions and the like, comprising a stud element having oppositely extended reinforcing flanges adapted to be set at substantially right angles to the general plane of the wall and like structure, said flanges being further disposed in spaced planes and connected by transverse portions, spaced longitudinally of the structural element, and opposed members to be supported with said stud element therebetween, having an extension element constructed for projection through said aperture from respective sides, the structural element and devices including rest elements on one constructed to coengage with the other, and support such object in a predetermined operative relation to the structural element, for the purpose described.

3. In a structure of the character described, a structural element for walls, partitions and the like, comprising a stud element having opposed faces and oppositely extended flanges, a rest element between the opposed faces and an anchor element spaced thereabove, a shelf device having a portion thereon adapted to be engaged between the rest element and anchor element, and means coactive between the shelf device and structural element at normal operative position of said portion to prevent withdrawal of the shelf device from operative position.

4. In a structure of the character described, a structural element for walls, partitions and the like, comprising a stud element having opposed faces and oppositely extended flanges, a rest element between the opposed faces and an anchor element spaced thereabove, said rest element extending outwardly of the anchor element a distance, and a shelf device having a portion thereon adapted to be engaged between the rest element and anchor element, and means coactive between the shelf device and the structural element at normal operative position of said portion to prevent withdrawal of the shelf device from operative position.

5. A stud or the like consisting of an element having portions set in spaced planes including opposed faces and oppositely extended flanges, an intermediate rest element and an anchor element spaced thereabove.

6. A stud or the like consisting of an element having two lateral flanged portions of right angular form in transverse section, said portions being set in spaced planes with opposed flanges oppositely extended in parallel relation, a rest element with an anchor element spaced thereabove and being located intermediately relative to transverse section of the stud, and a device to be supported, having a portion constructed for engagement with said seat and anchor element.

7. A stud or the like consisting of an element having oppositely extended extensions disposed in spaced planes relative to each other and further having an intermediate seat element with a co-operative anchor element spaced thereabove, said seat element being composed of a piece of shaped stock material to provide an upper support surface portion and a diagonal brace portion extending from its outer part downward, and a device to be supported, having a portion positioned upon the seat element and of a height to engage the anchor element thereabove.

8. The structure of claim 7 in which said extensions are connected by a transverse portion having an aperture therethrough defining the space between said upper support portion and anchor element, and said portion of the device to be supported including an extension element being insertable through said aperture to engage the upper end thereof, defining said anchor element.

9. A stud or the like consisting of oppositely extended flanges and a connecting web, rest elements with an anchor element spaced above each rest element, the rest elements being positioned intermediately relative to transverse section of the stud and projected outwardly beyond the anchor element.

10. The structure of claim 9 in which the anchor elements are inclined with respect to the flanges and web.

11. A device of the character described, comprising in combination, a stud element of substantially Z-shape in cross section providing a medial portion and oppositely disposed extensions therefrom, the width of said extensions being greater than the medial portion, the medial portion having an aperture therethrough, and a releasable shelf device having an extension projected through the aperture.

12. A device of the character described, comprising in combination, a stud element consisting of separate pieces arranged and secured to provide a medial portion and oppositely disposed flanges, the medial portion having an aperture therethrough, and a releasable shelf device having an extension projected through said aperture.

13. The structure of claim 12 in which one flange and medial portion consists of an angle member, supplemented by a separate second flange piece.

14. A device of the character described, comprising in combination, a stud element of substantially Z-shape in cross section providing a medial portion and oppositely extended extensions, the medial portion having an aperture therethrough, a releasable shelf device having an extension projected through said aperture, and a rest for said shelf located substantially at the height of the lower end of the aperture and outwardly thereof.

15. A structural element comprising a member adapted to be erected in vertical position in wall structures and the like, and comprising a stud element having oppositely extended reinforcing flanges adapted to be set at substantially right angles to the general plane of the wall and like structure, said flanges being in spaced planes and the dimension of the transverse extension of said flanges being greater than the separating space between said flanges, transverse connecting portions therebetween, spaced longitudinally of the structural element, and a member to be supported having an extension constructed for projection through said aperture, the structural member and devices including rest elements on one constructed to coengage with the other, and support such object in a predetermined operative relation to the structural element, for the purpose described.

16. A device of the character described, comprising in combination, a stud element having a central web portion and oppositely extended flanges, said web having an aperture therethrough, the upper side of the aperture being defined by an edge element of a thickness greater than said web, a releasable shelf device having an extension element projected through the aperture, and engaging means to secure the shelf device against casual withdrawal.

17. A device of the character described, comprising in combination, a stud element of substantially Z-shape in cross section providing a medial portion and oppositely disposed extensions, the medial portion having an aperture therethrough, and a shelf device having an arm projected through said aperture, the upper edge of said aperture having two edge portions positioned at a common level spaced equally from a medial line of the medial portion, and said arm having means cooperable with said edge portions to secure the shield against casual withdrawal.

18. The structure of claim 1 in which said medial portion is defined by a connecting web portion disposed at an oblique angle to said flanges.

19. A stud or the like consisting of an element having oppositely extended extensions disposed in spaced planes relative to each other and further having a seat element located intermediately in relation to transverse section of the stud, a cooperative anchor element with a V-shaped edge element spaced above the seat element, and a device to be supported, having a portion constructed for engagement with said seat and anchor element, and having a notch therein to receive said edge element.

20. A device of the character described, comprising in combination, a stud element having an aperture through a central web portion, flange elements fixed with the web at an angle thereto extending in opposite directions from the web in substantially parallel relation, a V-shaped edge element being located at the upper side of said aperture, and a device to be supported, having an extension constructed for insertion through said aperture, and having a notch therein to receive said edge element.

21. The structure of claim 19 in which the anchor element includes two parallel edge elements spaced from a medial transverse vertical plane in the stud, each being in engaging relation with the respective extension of oppositely located supported devices having said stud therebetween.

22. The structure of claim 20 in which the flanges are separate pieces, and the web portion is provided by transverse members connected between the flanges.

23. The structure of claim 3 in which the flanges are separate pieces having said rest and anchor element secured thereto, and said anchor element including two parallel edge elements at a common level spaced equally from a medial transverse vertical plane in the stud element and having their upper portions inclined inwardly toward said plane.

24. In a building structure, a vertical structural member having a central web portion apertured at intervals, a substantially V-shaped edge element being located at the upper sides of the apertures, continuous flange elements fixed with the web at right angles thereto extending in opposite directions from the web in parallel relation, the web extending between the flanges and having said apertures between the flanges, and a device to be supported, having a projecting arm constructed for insertion through one of the apertures and having a notch to receive said edge element, the web element including two edge elements at a common level spaced equally from a medial transverse vertical plane in the structural member, and said edge elements being in inclined position toward said plane.

25. A device of the character described, comprising in combination, a stud element or the like having oppositely extended extensions disposed in spaced planes relative to each other, at least two members to be supported with said stud element therebetween, means for releasable engagement with a respectively adapted portion of said members presented from opposite sides of the stud, and said means being located in substantially intermediate relation to said extensions.

26. An upright support element having a seat element and a cooperative anchor element spaced thereabove, said seat element comprising shaped stock material having an upper support surface portion and further having a brace portion being downwardly extended from the outer part of said support portion and disposed in a substantially acute angular relation thereto, and a device to be supported, having a portion adapted to be positioned upon said seat element and of a height to engage the anchor element thereabove.

27. The structure of claim 26 in which said upright support element includes two spaced members having opposed flanges disposed in substantially parallel relation to each other, and said seat element and anchor element being located between said members.

28. The structure of claim 26 in which said stock material is defined by a substantial width and narrow thickness, and the width of said stock material being disposed in a plane at right angle to the upright axis of said support element.

29. A device of the character described, comprising in combination, a stud element or the like having oppositely extended flanges disposed in spaced planes relative to each other, a shelf device to be supported having a support arm, means for releasable engagement with a projecting portion of said arm, and said means and arm being positioned in intermediate and parallel relation to said flanges respectively.

30. A device of the character described, comprising in combination, a stud element or the like having a medial portion and oppositely extended flanges disposed in substantially parallel relation to each other, said medial portion having apertures therethrough spaced longitudinally of the stud, at least two members to be supported with said stud element therebetween, each having an extension element insertable through one of said apertures from respective sides of the stud.

FREDERICK KAUTZ.